(12) United States Patent
Kim et al.

(10) Patent No.: US 8,890,367 B2
(45) Date of Patent: Nov. 18, 2014

(54) RESONANCE POWER RECEIVER THAT INCLUDES A PLURALITY OF RESONATORS

(75) Inventors: Nam Yun Kim, Seoul (KR); Sang Wook Kwon, Seongnam-si (KR); Young Tack Hong, Seongnam-si (KR); Eun Seok Park, Suwon-si (KR); Young Ho Ryu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 958 days.

(21) Appl. No.: 12/967,277

(22) Filed: Dec. 14, 2010

(65) Prior Publication Data

US 2011/0156489 A1 Jun. 30, 2011

(30) Foreign Application Priority Data

Dec. 29, 2009 (KR) .................. 10-2009-0133267

(51) Int. Cl.
| | | |
|---|---|---|
| H01F 38/00 | (2006.01) | |
| H01F 27/42 | (2006.01) | |
| H01F 37/00 | (2006.01) | |
| H04B 5/00 | (2006.01) | |
| H02J 5/00 | (2006.01) | |

(52) U.S. Cl.
CPC ............ *H04B 5/0075* (2013.01); *H02J 5/005* (2013.01); *H04B 5/0037* (2013.01)

USPC ........................... 307/104; 363/67; 235/492

(58) Field of Classification Search
CPC ...... H02J 5/005; H04B 5/0037; H04B 5/0075
USPC ........................................... 307/104
See application file for complete search history.

(56) References Cited

U.S. PATENT DOCUMENTS

| | | | |
|---|---|---|---|
| 6,304,059 B1 * | 10/2001 | Chalasani et al. ............ 320/118 |
| 8,200,302 B2 * | 6/2012 | Yamamoto et al. ......... 455/575.7 |
| 8,354,825 B2 * | 1/2013 | Lee et al. ....................... 320/118 |
| 2008/0210762 A1 * | 9/2008 | Osada et al. .................. 235/492 |
| 2008/0264731 A1 * | 10/2008 | Mangini et al. ............... 187/382 |
| 2010/0033021 A1 * | 2/2010 | Bennett ........................ 307/104 |
| 2010/0295506 A1 * | 11/2010 | Ichikawa ...................... 320/108 |

FOREIGN PATENT DOCUMENTS

| | | |
|---|---|---|
| JP | 2006-025069 | 1/2006 |
| JP | 2008-061208 | 3/2008 |
| KR | 10-2009-0019308 | 2/2009 |

\* cited by examiner

*Primary Examiner* — Jared Fureman
*Assistant Examiner* — Toan Vu
(74) *Attorney, Agent, or Firm* — NSIP Law

(57) ABSTRACT

Provided is a resonance power receiver, including a first resonator, a second resonator to receive a resonance power and a phase shifter to shift the phase of the signal received via the second resonator such that the signal received via the first resonator and the signal received via the second resonator are in phase.

8 Claims, 15 Drawing Sheets

$$W_{MZR} = \frac{1}{\sqrt{L_R C_L}}$$

RESONANCE POWER RECEIVER THAT INCLUDES A PLURALITY OF RESONATORS

CROSS-REFERENCE TO RELATED APPLICATION(S)

This application claims the benefit under 35 U.S.C. §119(a) of Korean Patent Application No. 10-2009-0133267, filed on Dec. 29, 2009, in the Korean Intellectual Property Office, the entire disclosure of which is incorporated herein by reference for all purposes.

BACKGROUND

1. Field

The following description relates to a wireless power transmission system, for example, a resonance power transmission system.

2. Description of Related Art

With the development of Information Technology (IT), the amount and variety of portable electronic devices have increased. Because of the characteristics of the portable electronic devices, battery performance of a corresponding portable electronic device is an important issue. In addition to the portable electronic devices, home electronic appliances can be supplied with power over a power line.

Currently, researches have been conducted on wireless power transmission technology that may wirelessly supply power. For example, a resonance power generator may wirelessly transmit power using a power resonator, and a resonance power receiver may wirelessly receive power using a reception resonator or a target resonator.

However, there is a desire for a resonance power receiver that may effectively increase the amount of power available for use.

SUMMARY

In one general aspect, there is provided a resonance power receiver, comprising a first resonator and a second resonator to receive a resonance power, a phase detector to detect a phase of a signal received via the first resonator, and to detect a phase of a signal receive via the second resonator, a phase shifter to shift the phase of the signal received via the second resonator so that the phase of the signal received via the first resonator and the phase of the signal received via the second resonator are in phase, and a combiner to combine the signal received via the first resonator with the signal of which the phase is shifted by the phase shifter.

The resonance power receiver may further comprise a rectifier to generate a direct current (DC) voltage by rectifying an output signal of the combiner.

The resonance power receiver may further comprise a DC-to-DC (DC/DC) converter to provide an output voltage of the rectifier to a load.

The resonance power receiver may further comprise a switch unit to connect an output voltage of the rectifier to a load when the signal received via the first resonator is in-phase combined with the signal of which the phase is shifted by the phase shifter.

In another aspect, there is provided a resonance power receiver, comprising a reception resonance unit comprising a plurality of resonators to receive a resonance power, a rectification unit comprising a plurality of rectifiers to rectify an output signal of each of the resonators, respectively, a charging unit to store an output voltage of each of the rectifiers, and a switch unit to selectively switch a voltage stored in the charging unit based on a power consumption mode.

The charging unit may be configured to receive the output voltage of each of the rectifiers via a plurality of input terminals connected to the plurality of rectifiers, respectively, and may be connected to the switch unit via a single output terminal.

The charging unit may comprise a plurality of chargers that are connected to the plurality of rectifiers, respectively, and the switch unit may be configured to selectively switch each of the chargers based on a power consumption mode.

When the power consumption mode corresponds to an operating mode, the switch unit may be configured to switch the voltage stored in the charging unit to be provided to all the loads desiring power.

When the power consumption mode corresponds to a sleep mode or a power save mode, the switch unit may be configured to switch the voltage stored in the charging unit to be provided to a particular load for performing an idle operation of the resonance power receiver.

The resonance power receiver may further comprise a first phase detector to detect a phase of a signal received via a first resonator from among the plurality of resonators, and to detect a phase of a signal received via a second resonator, a first phase shifter to shift the phase of the signal received via the second resonator so that the phase of the signal received via the first resonator and the phase of the signal received via the second resonator are in phase, a first combiner to combine the signal of the received via the first resonator with the signal of which the phase is shifted by the first phase shifter, a second phase detector to detect a phase of a signal received via a third resonator from among the plurality of resonators, and to detect a phase of a signal received via a fourth resonator, a second phase shifter to shift the phase of the signal received via the fourth resonator so that the phase of the signal received via the third resonator and the phase of the signal received via the fourth resonator are in phase, and a second combiner to combine the signal received via the third resonator with the signal of which the phase is shifted by the second phase shifter.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, description of well-known functions and constructions may be omitted for increased clarity and conciseness.

As described herein, for example, the source or transmitter may be, or may be included in, a terminal, such as a mobile terminal, a personal computer, a personal digital assistant (PDA), an MP3 player, and the like. As another example, the target or receiver described herein may be, or may be included in, a terminal, such as a mobile terminal, a personal computer, a personal digital assistant (PDA), an MP3 player, and the like. As another example, the transmitter and/or the receiver may be a separate individual unit.

Figure 1:
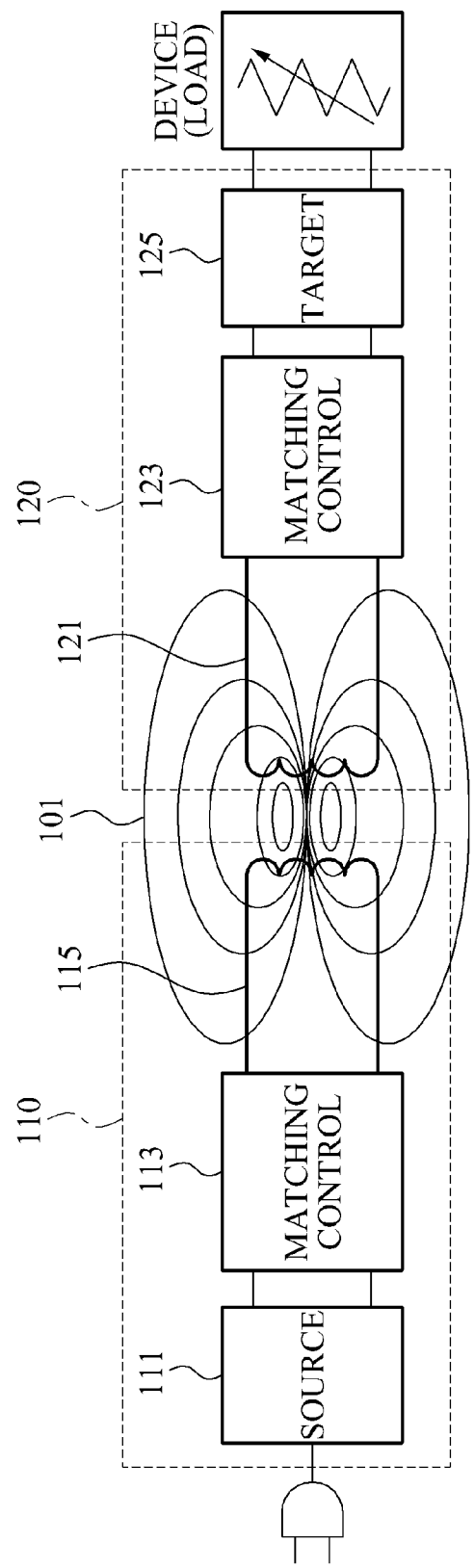
FIG. 1 is a diagram illustrating an example of a wireless power transmission system.

FIG. 1 illustrates an example of a wireless power transmission system.

As described herein, wireless power transmitted using a wireless power transmission system may be referred to as resonance power.

Referring to FIG. 1, the wireless power transmission system has a source-target structure including a source and a target. In this example, the wireless power transmission system includes a resonance power transmitter 110 corresponding to the source and a resonance power receiver 120 corresponding to the target.

The resonance power transmitter 110 includes a source unit 111 and a source resonator 115. The source unit 111 may receive energy from an external voltage supply to generate a resonance power. The resonance power transmitter 110 may further include a matching control 113 to perform resonance frequency matching and/or impedance matching.

For example, the source unit 111 may include an alternating current (AC)-to-AC (AC/AC) converter, an AC-to-direct current (DC) (AC/DC) converter, a (DC/AC) inverter, and the like. The AC/AC converter may adjust, to a desired level, a signal level of an AC signal input from an external device. The AC/DC converter may output a DC voltage at a predetermined level by rectifying an AC signal output from the AC/AC converter. For example the DC/AC inverter may generate an AC signal of one or more megahertz (MHz) to tens of MHz band by quickly switching a DC voltage output from the AC/DC converter.

The matching control 113 may set at least one of a resonance bandwidth of the source resonator 115 and an impedance matching frequency of the source resonator 115. Although not illustrated in FIG. 1, the matching control 113 may include at least one of a source resonance bandwidth setting unit and a source matching frequency setting unit. The source resonance bandwidth setting unit may set the resonance bandwidth of the source resonator 115. The source matching frequency setting unit may set the impedance matching frequency of the source resonator 115. For example, a Q-factor of the source resonator 115 may be determined based on a setting of the resonance bandwidth of the source resonator 115 or a setting of the impedance matching frequency of the source resonator 115.

The source resonator 115 may transfer electromagnetic energy to a target resonator 121. For example, the source resonator 115 may transfer the resonance power to the resonance power receiver 120 through magnetic coupling 101 with the target resonator 121. The source resonator 115 may resonate within the set resonance bandwidth.

In this example, the resonance power receiver 120 includes the target resonator 121, a matching control 123 to perform resonance frequency matching or impedance matching, and a target unit 125 to transfer the received resonance power to a load.

The target resonator 121 may receive the electromagnetic energy from the source resonator 115. The target resonator 121 may resonate within the set resonance bandwidth.

For example, the matching control 123 may set at least one of a resonance bandwidth of the target resonator 121 and an impedance matching frequency of the target resonator 121. Although not illustrated in FIG. 1, the matching control 123 may include at least one of a target resonance bandwidth setting unit and a target matching frequency setting unit. The target resonance bandwidth setting unit may set the resonance bandwidth of the target resonator 121. The target matching frequency setting unit may set the impedance matching frequency of the target resonator 121. For example, a Q-factor of the target resonator 121 may be determined based on a setting of the resonance bandwidth of the target resonator 121 and/or a setting of the impedance matching frequency of the target resonator 121.

The target unit 125 may transfer the received resonance power to the load. For example, the target unit 125 may include an AC/DC converter and a DC/DC converter. The AC/DC converter may generate a DC voltage by rectifying an AC signal transmitted from the source resonator 115 to the target resonator 121. The DC/DC converter may supply a rated voltage to a device or the load by adjusting a voltage level of the DC voltage.

For example, the source resonator 115 and the target resonator 121 may be configured in a helix coil structured resonator, a spiral coil structured resonator, a meta-structured resonator, and the like.

Referring to FIG. 1, a process of controlling the Q-factor may include, for example, setting the resonance bandwidth of the source resonator 115 and the resonance bandwidth of the target resonator 121, and transferring the electromagnetic energy from the source resonator 115 to the target resonator 121 through magnetic coupling 101 between the source resonator 115 and the target resonator 121. The resonance bandwidth of the source resonator 115 may be set wider or narrower than the resonance bandwidth of the target resonator 121. For example, an unbalanced relationship between a BW-factor of the source resonator 115 and a BW-factor of the target resonator 121 may be maintained by setting the resonance bandwidth of the source resonator 115 to be wider or narrower than the resonance bandwidth of the target resonator 121.

In a wireless power transmission system employing a resonance scheme, the resonance bandwidth may be an important factor. When the Q-factor considering a change in a distance between the source resonator 115 and the target resonator 121, a change in the resonance impedance, impedance mismatching, a reflected signal, and the like, is Qt, Qt may have an inverse-proportional relationship with the resonance bandwidth, as given by Equation 1.

$$\frac{\Delta f}{f_0} = \frac{1}{Qt} \qquad \text{[Equation 1]}$$
$$= \Gamma_{S,D} + \frac{1}{BW_S} + \frac{1}{BW_D}$$

In Equation 1, $f_0$ denotes a central frequency, $\Delta f$ denotes a change in bandwidth, $\Gamma_{S,D}$ denotes a reflection loss between the source resonator 115 and the target resonator 121, $BW_S$ denotes the resonance bandwidth of the source resonator 115, and $BW_D$ denotes the resonance bandwidth of the target resonator 121. For example, the BW-factor may indicate either $1/BW_S$ or $1/BW_D$.

Due to an external effect such as a change in the distance between the source resonator 115 and the target resonator 121, a change in a location of at least one of the source resonator 115 and the target resonator 121, and the like, may cause an impedance mismatching between the source resonator 115 and the target resonator 121 to occur. The impedance mismatching may be a cause in decreasing an efficiency of power transfer. When a reflected wave corresponding to a transmission signal that is partially reflected by a target and returned is detected, the matching control 113 may determine the impedance mismatching has occurred, and may perform impedance matching. The matching control 113 may change a resonance frequency by detecting a resonance point through waveform analysis of the reflected wave. For example, the matching control 113 may determine a frequency that generates a minimum amplitude in the waveform of the reflected wave, as the resonance frequency.

Figure 2:
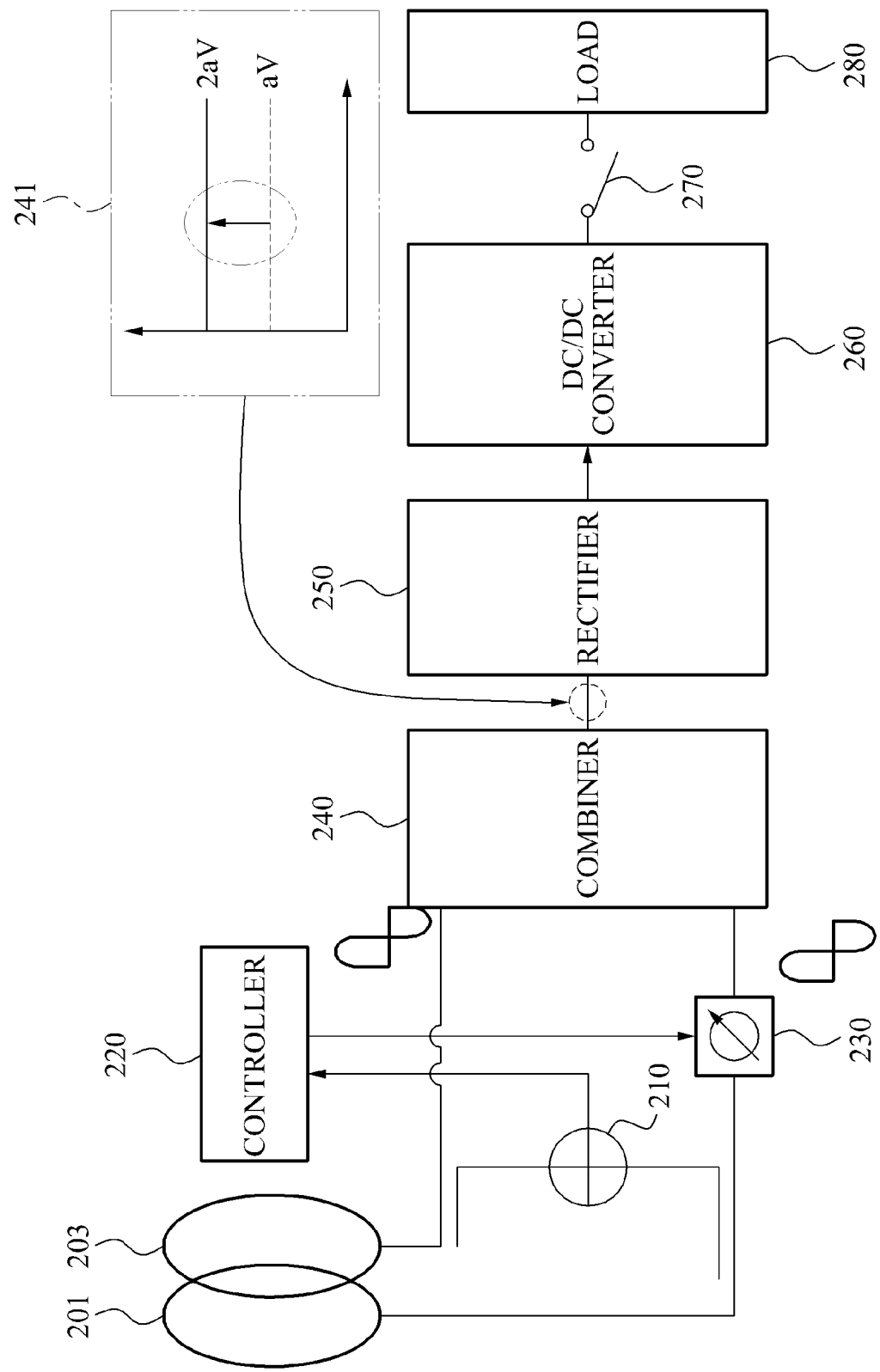
FIG. 2 is a diagram illustrating an example of a resonance power receiver.

FIG. 2 illustrates an example of a resonance power receiver.

Referring to FIG. 2, the resonance power receiver may include at least two resonators, for example, a first resonator 201 and a second resonator 203, a phase detector 210, a controller 220, a phase shifter 230, and a combiner 240. The resonance power receiver may further include a rectifier 250, a DC/DC converter 260, and a switch unit 270.

For example, each of the first resonator 201 and the second resonator 203 may be configured as balanced-resonators. Each of the first resonator 201 and the second resonator 203 may receive resonance power from a source. As another example, the first resonator 201 and/or the second resonator 203 may be replaced with N balanced-resonators.

The phase detector 210 may detect a phase of a signal such as a resonance power that is received via each of the first resonator 201 and the third resonator 203. For example, the phase of the resonance power may include one of a phase of a receive voltage and a phase of a receive current.

The controller 220 may control an overall operation of the resonance power receiver. For example, the controller 220 may compare the phase of the signal received via the first resonator 201 with the phase of the signal received via the second resonator 203, and may control the phase shifter 230 based on the comparison result.

The phase shifter 230 may shift the phase of the signal received via the first resonator 201 such that the phase of the signal received via the first resonator 201 and the phase of the signal received signal via the second resonator 203 are in phase. For example, phase shifter 230 may shift the phase of the signal received via the first resonator 201 such that the phase of the signal received via the first resonator 201 and the phase of the signal received signal via the second resonator 203 are the same.

For example, the combiner 240 may combine the signal received via the second resonator 203 with the signal that has the phase shifted by the phase shifter 230. For example, the combiner 240 may perform an in-phase combination for signals that are received via two paths using two balanced-resonators. For example, when an output voltage is aV before the in-phase combination is performed, an output voltage after the in-phase combination is performed may be 2 aV. Accordingly, the power received via the first resonator 201 and the second resonator 203 may be in-phase combined. As shown in a block 241, for example, the in-phase power combination may increase the voltage by 3 dB and thus, the amount of power may be doubled.

For example, the rectifier 250 may generate a DC voltage by rectifying an output signal of the combiner 240. For example, the rectifier 250 may include at least one diode, a resistance, a condenser, a coil, and the like. As another example, the rectifier 250 may include a smoothing circuit, and the rectifier 250 may convert a high frequency signal to a DC voltage using the smoothing circuit.

The DC/DC converter 260 may perform a DC/DC conversion to provide a DC voltage output from the rectifier 250, to a load 280.

The switch unit 270 may switch an output voltage of the DC/DC converter 260 to the load 280. For example, when the signal received via the second resonator 230 is in-phase combined with the signal that has its phase shifted by the phase shifter 230, the switch unit 270 may connect the output voltage of the rectifier 250 to the load 280.

Figure 3:
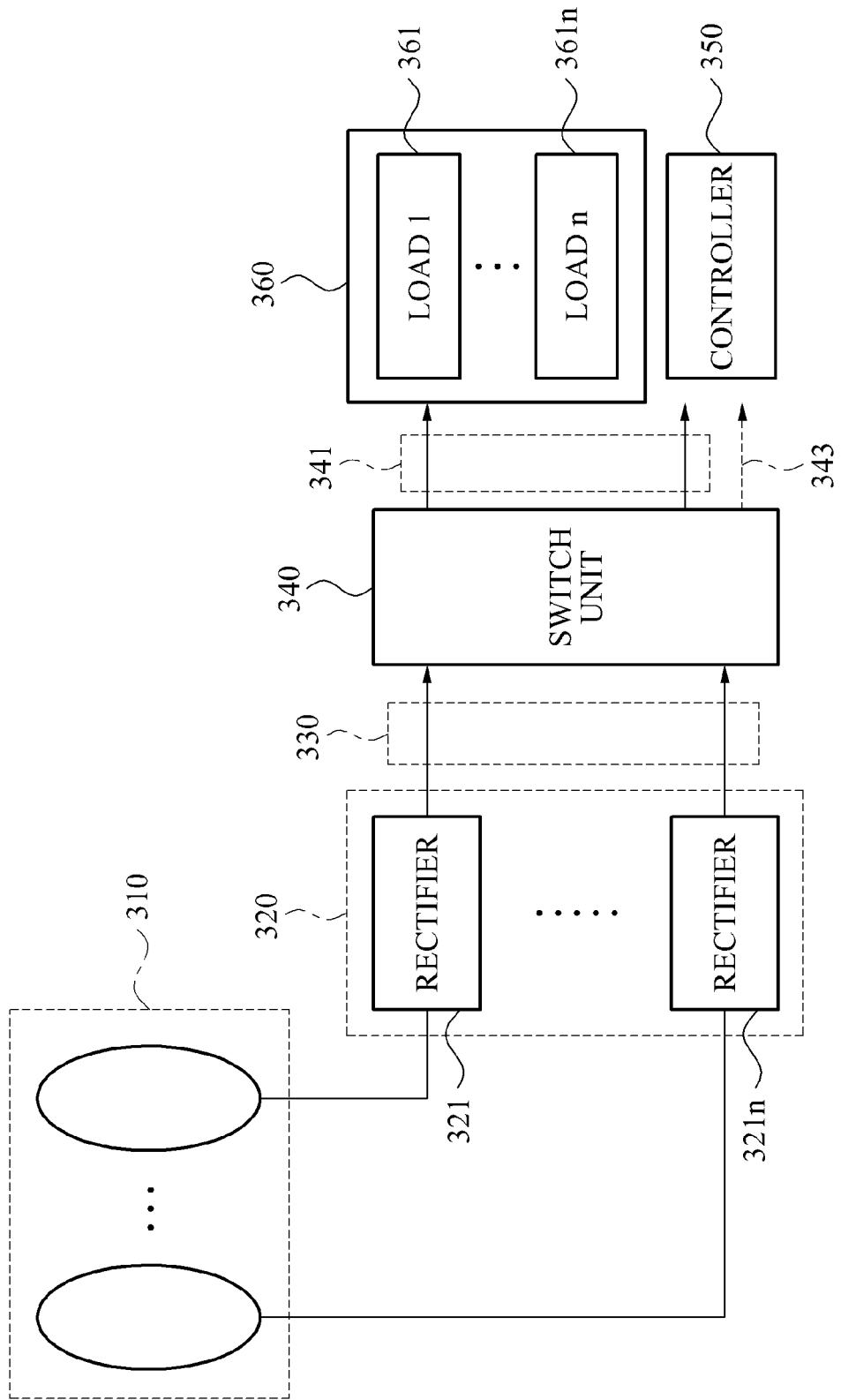
FIG. 3 is a diagram illustrating another example of a resonance power receiver.

FIG. 3 illustrates another example of a resonance power receiver.

Referring to FIG. 3, the resonance power receiver includes a reception resonance unit 310, a rectification unit 320, a charging unit 330, and a switch unit 340. The resonance power receiver may further include a load 360, for example, a communication module, and the like, and a controller 350 to function as a main processor.

The reception resonance unit 310 may include a plurality of resonators. For example, each of the resonators may be configured as balanced-resonators.

The rectification unit 320 may include a plurality of rectifiers 321, 321*n* to rectify an output signal of each of the resonators, respectively.

Figure 4:
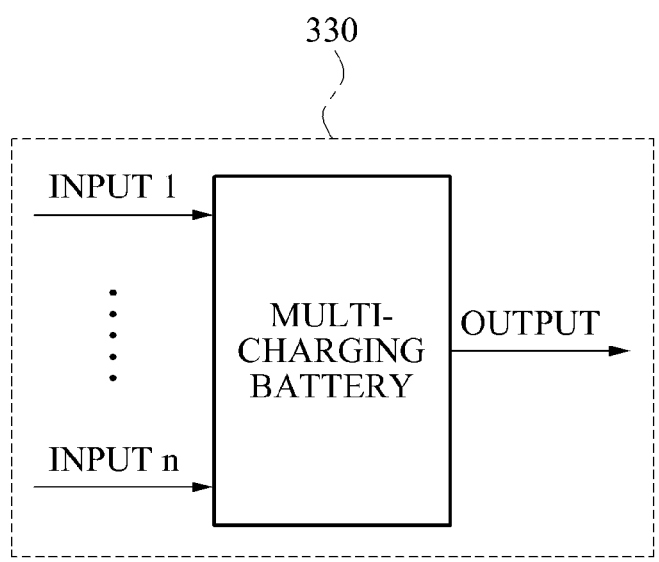
FIG. 4 and FIG. 5 are diagrams illustrating examples of a charging unit.
Figure 5:
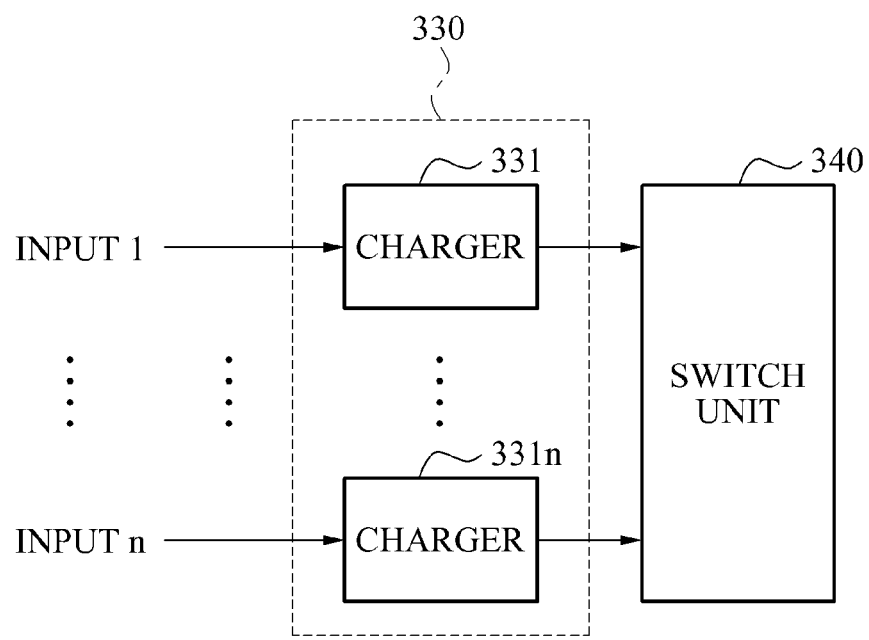

The charging unit 330 may store an output voltage of each of the rectifiers 321, 321*n*. For example, the charging unit 330 may be configured as shown in FIG. 4 or FIG. 5. Referring to FIG. 4, the charging unit 330 may include a multi-charging battery. The charging unit 330 may receive the output voltage of each of the rectifiers 321, . . . , 321*n* via a plurality of input terminals INPUT1, . . . , Input, respectively, connected to the plurality of rectifiers 321, . . . , 321*n*, and may be connected to the switch unit 340 via a single output terminal OUTPUT. Referring to FIG. 5, the charging unit 330 may include a plurality of chargers 331, 331*n* connected to the plurality of rectifiers 321, 321*n*, respectively. When the charging unit 330 is configured as shown in FIG. 5, the switch unit 340 may selectively switch each of the chargers 331, 331*n* based on a power consumption mode.

For example, the switch unit 340 may selectively switch a voltage stored in the charging unit 330, based on the power consumption mode of the resonance power receiver.

For example, when the power consumption mode of the resonance power receiver corresponds to an operating mode, the switch unit 340 may switch, via a portion 341 indicated by a dotted box, the voltage stored in the charging unit 330 which is to be provided to the load 360 including a load (1) 361, . . . , a load (n) 361*n*, and the controller 350 desiring power. For example, the operating mode may correspond to a normal operating state where the resonance power receiver consumes the power.

For example, when the power consumption mode corresponds to a sleep mode or a power save mode, the switch unit 340 may switch, via an output 343 indicated by a dotted line, the voltage stored in the charging unit 330 which is to be provided to a particular load, for example, the controller 350 for performing an idle operation of the resonance power receiver. The sleep mode may correspond to a state where the resonance power receiver performs a limited operation such as a communication standby and the like. The power save mode may correspond to a state where a voltage is being provided for charging to the charging unit 330 when no load consumes the power or when no power remains.

Figure 6:
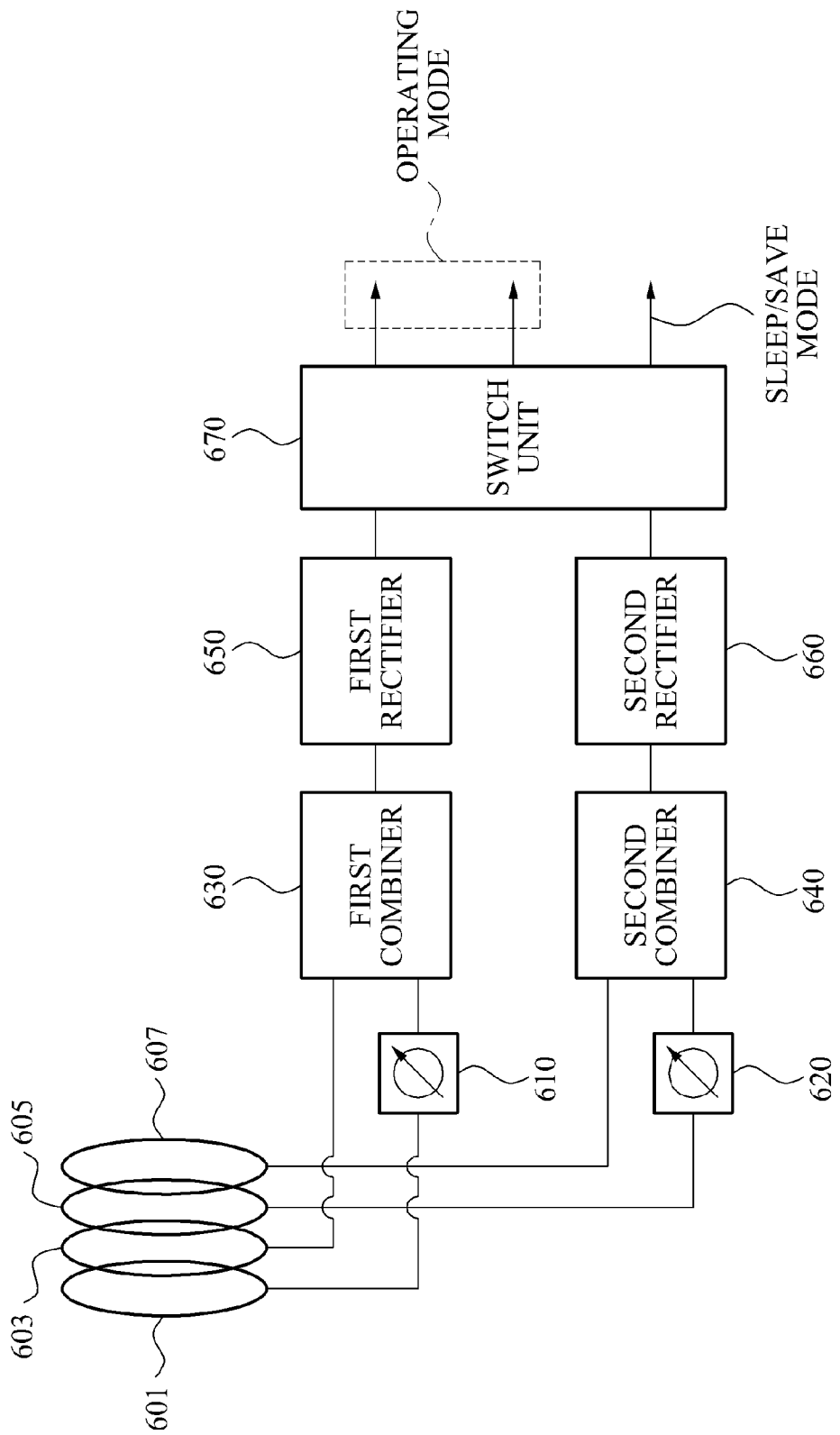
FIG. 6 is a diagram illustrating another example of a resonance power receiver.

FIG. 6 illustrates another example of a resonance power receiver.

The resonance power receiver of FIG. 6 includes a configuration in which the resonance power receiver of FIG. 2 and the resonance power receiver of FIG. 3 are combined with each other. Referring to FIG. 6, the resonance power receiver includes a first phase detector (not shown), a first phase shifter 610, a first combiner 630, a first rectifier 650, a second phase detector (not shown), a second phase shifter 620, a second combiner 640, a second rectifier 660, and a switch unit 670.

Each of the first phase detector and the second phase detector may perform the same function as the phase detector 210 of FIG. 2. For example, the first phase detector may detect a phase of a signal received via a first resonator 601 from among a plurality of resonators, and may detect a phase of a signal received via a second resonator 603. The second phase detector may detect a phase of a signal received via a third resonator 605 from among the plurality of resonators and detect a phase of a signal received via a fourth resonator 607.

The first phase shifter 610 may shift the phase of the signal received via the first resonator 601 based on the control of a controller (not shown). For example, the first phase shifter 610 may perform a phase shift such that the phase of the signal received via the first resonator 601 and the phase of the signal received via the second resonator 603 are in phase. For example, the first phase shifter 610 may perform a phase shift such that the phase of the signal received via the first resonator 601 and the phase of the signal received via the second resonator 603 are aligned.

For example, the first combiner 630 may combine an output signal of the first phase shifter 610 with the signal received via the second resonator 603. Accordingly, the signal received via the first resonator 601 and the signal received via the second resonator 603 may be in-phase combined using the first combiner 630. The first rectifier 650 may generate a DC voltage by rectifying an output signal of the first combiner 630.

The second phase shifter 620, the second combiner 640, and the second rectifier 660 may perform the same function as the first phase shifter 610, the first combiner 630, and the first rectifier 650 with respect to the phase of the signal received via the third resonator 605 from among the plurality of resonators and the phase of the signal received via the fourth resonator 607.

The switch unit 670 may perform the same function as the switch unit 340 of FIG. 3.

Although not illustrated in FIG. 6, the resonance power receiver of FIG. 6 may further include a charging unit similar to the charging unit 330 of FIG. 3.

As described herein, the power reception receiver may effectively increase power available for use. For example, the power available for use may be effectively distributed based on a power consumption mode of a load. For example, the power available for use may effectively increase through an in-phase combination of the reception power. As an example, a source resonator and/or a target resonator may be configured as a helix coil structured resonator, a spiral coil structured resonator, a meta-structured resonator, and the like.

Various materials may have a unique magnetic permeability, for example, Mµ and a unique permittivity, for example, epsilon ( ). The magnetic permeability indicates a ratio between a magnetic flux density occurring with respect to a given magnetic field in a corresponding material and a magnetic flux density occurring with respect to the given magnetic field in a vacuum state. For example, the magnetic permeability and the permittivity may determine a propagation constant of a corresponding material at a given frequency or at a given wavelength.

An electromagnetic characteristic of the corresponding material may be determined based on the magnetic permeability and the permittivity. For example, a material that has a magnetic permeability or a permittivity absent in nature and that is artificially designed may be referred to as a metamaterial. The metamaterial may be disposed in a resonance state even in a relatively large wavelength area or a relatively low frequency area. For example, even though a material size rarely varies, the metamaterial may be easily disposed in the resonance state.

Figure 7:
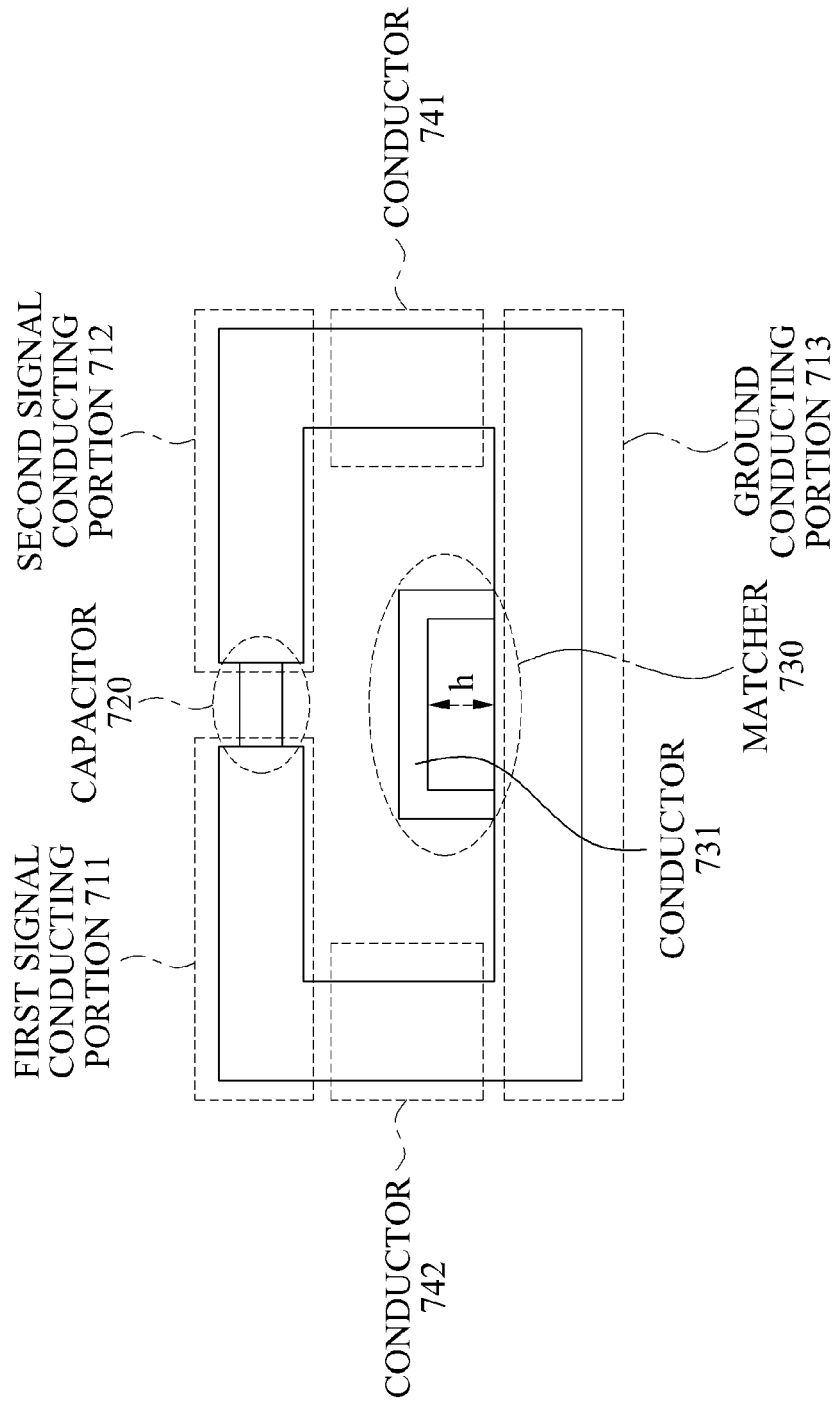
FIG. 7 through FIG. 13 are diagrams illustrating various examples of a resonator structure.

FIG. 7 illustrates an example of a resonator that has a two-dimensional (2D) structure.

Referring to FIG. 7, resonator 700 that has a 2D structure includes a transmission line, a capacitor 720, a matcher 730, and conductors 741 and 742. The transmission line may include a first signal conducting portion 711, a second signal conducting portion 712, and a ground conducting portion 713.

For example, the capacitor 720 may be inserted in series between the first signal conducting portion 711 and the second signal conducting portion 712, and an electric field may be confined within the capacitor 720. For example, the transmission line may include at least one conductor in an upper portion of the transmission line, and may also include at least one conductor in a lower portion of the transmission line. Current may flow through the at least one conductor disposed in the upper portion of the transmission line, and the at least one conductor disposed in the lower portion of the transmission line may be electrically grounded. For example, a conductor disposed in an upper portion of the transmission line may be separated into and thereby be referred to as the first signal conducting portion 711 and the second signal conducting portion 712. A conductor disposed in the lower portion of the transmission line may be referred to as the ground conducting portion 713.

As shown in FIG. 7, the resonator 700 may have a 2D structure. The transmission line may include the first signal conducting portion 711 and the second signal conducting portion 712 in the upper portion of the transmission line. In addition, the transmission line may include the ground conducting portion 713 in the lower portion of the transmission line. The first signal conducting portion 711 and the second signal conducting portion 712 may be disposed to face the ground conducting portion 713. The current may flow through the first signal conducting portion 711 and the second signal conducting portion 712.

For example, one end of the first signal conducting portion 711 may be shorted to the conductor 742, and another end of the first signal conducting portion 711 may be connected to the capacitor 720. One end of the second signal conducting portion 712 may be grounded to the conductor 741, and another end of the second signal conducting portion 712 may be connected to the capacitor 720. Accordingly, the first signal conducting portion 711, the second signal conducting portion 712, the ground conducting portion 713, and the conductors 741 and 742 may be connected to each other such that the resonator 700 has an electrically closed-loop structure. The term "loop structure" may include, for example, a polygonal structure such as a circular structure, a rectangular structure, and the like. "Having a loop structure" may be used to indicate that the circuit is electrically closed.

The capacitor 720 may be inserted into an intermediate portion of the transmission line. For example, the capacitor 720 may be inserted into a space between the first signal conducting portion 711 and the second signal conducting portion 712. The capacitor 720 may have a shape of a lumped element, a distributed element, and the like. For example, a distributed capacitor having the shape of the distributed element may include zigzagged conductor lines and a dielectric material that has a relatively high permittivity between the zigzagged conductor lines.

When the capacitor 720 is inserted into the transmission line, the resonator 700 may have a property of a metamaterial. The metamaterial indicates a material having a predetermined electrical property that has not been discovered in nature, and thus, may have an artificially designed structure. An electromagnetic characteristic of the materials existing in nature may have a unique magnetic permeability or a unique permittivity. Most materials may have a positive magnetic permeability or a positive permittivity. In the case of most materials, a right hand rule may be applied to an electric field, a magnetic field, and a pointing vector, and thus, the corresponding materials may be referred to as right handed materials (RHMs). However, the metamaterial that has a magnetic permeability or a permittivity absent in nature may be classified into an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

When a capacitance of the capacitor inserted as the lumped element is determined, the resonator 700 may have the characteristic of the metamaterial. Because the resonator 700 may have a negative magnetic permeability by adjusting the capacitance of the capacitor 720, the resonator 700 may also be referred to as an MNG resonator. Various criteria may be applied to determine the capacitance of the capacitor 720. For example, the various criteria may include a criterion for enabling the resonator 700 to have the characteristic of the metamaterial, a criterion for enabling the resonator 700 to have a negative magnetic permeability in a target frequency, a criterion for enabling the resonator 700 to have a zeroth order resonance characteristic in the target frequency, and the like. The capacitance of the capacitor 720 may be determined based on one or more criterion.

The resonator 700, also referred to as the MNG resonator 700, may have a zeroth order resonance characteristic of having, as a resonance frequency, a frequency when a propagation constant is "0". For example, a zeroth order resonance characteristic may be a frequency transmitted through a line or a medium that has a propagation constant of "0." Because the resonator 700 may have the zeroth order resonance characteristic, the resonance frequency may be independent with respect to a physical size of the MNG resonator 700. By appropriately designing the capacitor 720, the MNG resonator 700 may sufficiently change the resonance frequency. Accordingly, the physical size of the MNG resonator 700 may not be changed.

In a near field, the electric field may be concentrated on the capacitor 720 inserted into the transmission line. Accordingly, due to the capacitor 720, the magnetic field may become dominant in the near field. The MNG resonator 700 may have a relatively high Q-factor using the capacitor 720 of the lumped element, and thus, it is possible to enhance an efficiency of power transmission. For example, the Q-factor may indicate a level of an ohmic loss or a ratio of a reactance with respect to a resistance in the wireless power transmission. For example, the efficiency of the wireless power transmission may increase according to an increase in the Q-factor.

The MNG resonator 700 may include a matcher 730 for impedance matching. The matcher 730 may adjust a strength of a magnetic field of the MNG resonator 700. An impedance of the MNG resonator 700 may be determined by the matcher 730. A current may flow into and/or out of the MNG resonator 700 via a connector. The connector may be connected to the ground conducting portion 713 or the matcher 730. The power may be transferred through coupling without using a physical connection between the connector and the ground conducting portion 713 or the matcher 730.

For example, as shown in FIG. 7, the matcher 730 may be positioned within the loop formed by the loop structure of the resonator 700. The matcher 730 may adjust the impedance of the resonator 700 by changing the physical shape of the matcher 730. For example, the matcher 730 may include the conductor 731 for the impedance matching in a location that is separated from the ground conducting portion 713 by a distance h. The impedance of the resonator 700 may be changed by adjusting the distance h.

Although not illustrated in FIG. 7, a controller may be provided to control the matcher 730. In this example, the matcher 730 may change the physical shape of the matcher 730 based on a control signal generated by the controller. For example, the distance h between the conductor 731 of the matcher 730 and the ground conducting portion 713 may increase or decrease based on the control signal. Accordingly, the physical shape of the matcher 730 may be changed and the impedance of the resonator 700 may be adjusted. The controller may generate the control signal based on various factors, which is described later.

As shown in FIG. 7, the matcher 730 may be configured as a passive element such as the conductor 731. For example, the matcher 730 may be configured as an active element such as a diode, a transistor, and the like. When the active element is included in the matcher 730, the active element may be driven based on the control signal generated by the controller, and the impedance of the resonator 700 may be adjusted based on the control signal. For example, a diode that is a type of the active element may be included in the matcher 730. For example, the impedance of the resonator 700 may be adjusted based on whether the diode is in an ON state or in an OFF state.

Although not illustrated in FIG. 7, a magnetic core may pass through the MNG resonator 700. The magnetic core may perform a function of increasing a power transmission distance.

Figure 8:
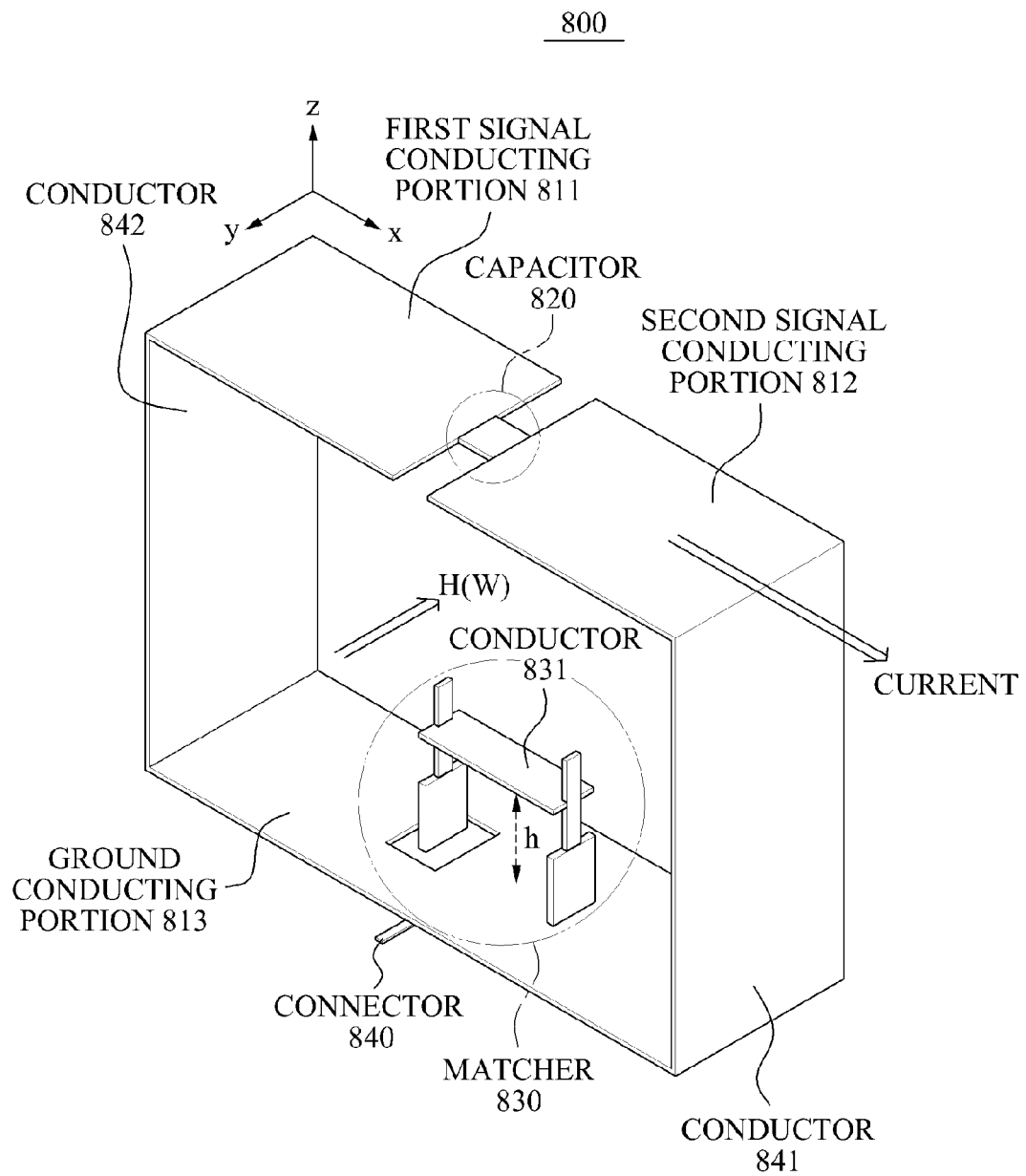

FIG. 8 illustrates an example of a resonator that has a three-dimensional (3D) structure.

Referring to FIG. 8, resonator 800 that has the 3D structure may include a transmission line and a capacitor 820. The transmission line may include a first signal conducting portion 811, a second signal conducting portion 812, and a ground conducting portion 813. The capacitor 820 may be inserted in series between the first signal conducting portion 811 and the second signal conducting portion 812 of the transmission link, and an electric field may be confined within the capacitor 820.

For example, the transmission line may include the first signal conducting portion 811 and the second signal conducting portion 812 in an upper portion of the resonator 800, and may include the ground conducting portion 813 in a lower portion of the resonator 800. The first signal conducting portion 811 and the second signal conducting portion 812 may be disposed to face the ground conducting portion 813. For example, current may flow in an x direction through the first signal conducting portion 811 and the second signal conducting portion 812. Due to the current, a magnetic field H(W) may be formed in a −y direction. Alternatively, unlike the diagram of FIG. 8, the magnetic field H(W) may be formed in a +y direction.

One end of the first signal conducting portion 811 may be shorted to the conductor 842, and another end of the first signal conducting portion 811 may be connected to the capacitor 820. One end of the second signal conducting portion 812 may be grounded to the conductor 841, and another end of the second signal conducting portion 812 may be connected to the capacitor 820. Accordingly, the first signal conducting portion 811, the second signal conducting portion 812, the ground conducting portion 813, and the conductors 841 and 842 may be connected to each other such that the resonator 800 has an electrically closed-loop structure.

As shown in FIG. 8, the capacitor 820 may be inserted between the first signal conducting portion 811 and the second signal conducting portion 812. For example, the capacitor 820 may be inserted into a space between the first signal conducting portion 811 and the second signal conducting portion 812. The capacitor 820 may have a shape of a lumped element, a distributed element, and the like. For example, a distributed capacitor having the shape of the distributed element may include zigzagged conductor lines and a dielectric material that has a relatively high permittivity between the zigzagged conductor lines.

As the capacitor 820 is inserted into the transmission line, the resonator 800 may have a property of a metamaterial.

When a capacitance of the capacitor inserted as the lumped element is appropriately determined, the resonator 800 may have the characteristic of the metamaterial. Because the resonator 800 may have a negative magnetic permeability by adjusting the capacitance of the capacitor 820, the resonator 800 may also be referred to as an MNG resonator. Various criteria may be applied to determine the capacitance of the capacitor 820. For example, the various criteria may include a criterion for enabling the resonator 800 to have the characteristic of the metamaterial, a criterion for enabling the resonator 800 to have a negative magnetic permeability in a target frequency, a criterion enabling the resonator 800 to have a zeroth order resonance characteristic in the target frequency, and the like. The capacitance of the capacitor 820 may be determined based on one or more criterion.

The resonator 800, also referred to as the MNG resonator 800, may have a zeroth order resonance characteristic that has, as a resonance frequency, a frequency when a propagation constant is "0". Because the resonator 800 may have the zeroth order resonance characteristic, the resonance frequency may be independent with respect to a physical size of the MNG resonator 800. By appropriately designing the capacitor 820, the MNG resonator 800 may sufficiently change the resonance frequency. Accordingly, the physical size of the MNG resonator 800 may not be changed.

Referring to the MNG resonator 800 of FIG. 8, in a near field, the electric field may be concentrated on the capacitor 820 inserted into the transmission line. Accordingly, due to the capacitor 820, the magnetic field may become dominant in the near field. For example, because the MNG resonator 800 having the zeroth-order resonance characteristic may have characteristics similar to a magnetic dipole, the magnetic field may become dominant in the near field. A relatively small amount of the electric field formed due to the insertion of the capacitor 820 may be concentrated on the capacitor 820, and thus, the magnetic field may become further dominant.

Also, the MNG resonator 800 may include a matcher 830 for impedance matching. The matcher 830 may adjust the strength of magnetic field of the MNG resonator 800. An impedance of the MNG resonator 800 may be determined by the matcher 830. Current may flow into and/or out of the MNG resonator 800 via a connector 840. The connector 840 may be connected to the ground conducting portion 813 or the matcher 830.

For example, as shown in FIG. 8, the matcher 830 may be positioned within the loop formed by the loop structure of the resonator 800. The matcher 830 may adjust the impedance of the resonator 800 by changing the physical shape of the matcher 830. For example, the matcher 830 may include the conductor 831 for the impedance matching in a location that is separated from the ground conducting portion 813 by a distance h. The impedance of the resonator 800 may be changed by adjusting the distance h.

Although not illustrated in FIG. 8, a controller may be provided to control the matcher 830. For example, the matcher 830 may change the physical shape of the matcher 830 based on a control signal generated by the controller. For example, the distance h between the conductor 831 of the matcher 830 and the ground conducting portion 813 may increase or decrease based on the control signal. Accordingly, the physical shape of the matcher 830 may be changed and the impedance of the resonator 800 may be adjusted. The distance h between the conductor 831 of the matcher 830 and the ground conducting portion 831 may be adjusted using a variety of schemes. As one example, a plurality of conductors may be included in the matcher 830 and the distance h may be adjusted by adaptively activating one of the conductors. As another example, the distance h may be adjusted by adjusting the physical location of the conductor 831 up and down. The distance h may be controlled based on the control signal of the controller. The controller may generate the control signal using various factors. An example of the controller generating the control signal is described later.

As shown in FIG. 8, the matcher 830 may be configured as a passive element such as the conductor 831. For example, the matcher 830 may be configured as an active element such as a diode, a transistor, and the like. When the active element is included in the matcher 830, the active element may be driven based on the control signal generated by the controller, and the impedance of the resonator 800 may be adjusted based on the control signal. For example, a diode that is a type of the active element may be included in the matcher 830. For example, the impedance of the resonator 800 may be adjusted based on whether the diode is in an ON state or in an OFF state.

Although not illustrated in FIG. 8, a magnetic core may be further provided to pass through the resonator 800 configured as the MNG resonator. The magnetic core may perform a function of increasing a power transmission distance.

Figure 9:
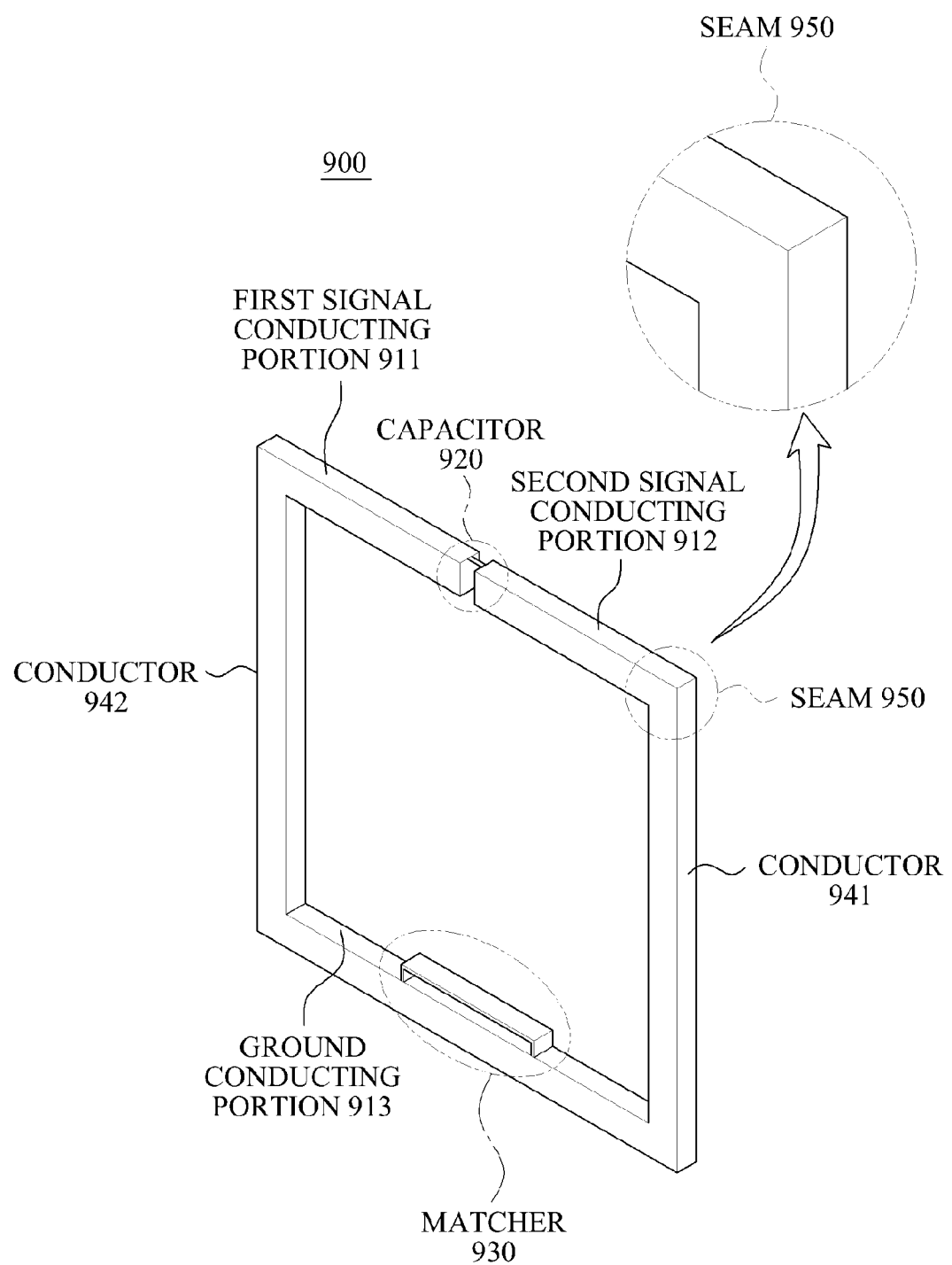

FIG. 9 illustrates an example of a bulky-type resonator for wireless power transmission.

Referring to FIG. 9, a first signal conducting portion 911 and a second signal conducting portion 912 may be integrally formed instead of being separately manufactured and thereafter connected to each other. As another example, the second signal conducting portion 912 and the conductor 941 may be integrally manufactured.

When the second signal conducting portion 912 and the conductor 941 are separately manufactured and then are connected to each other, a loss of conduction may occur due to a seam 950. Accordingly, the second signal conducting portion 912 and the conductor 941 may be connected to each other without generating a seam, that is, they may be seamlessly connected to each other. Accordingly, it is possible to decrease a conductor loss caused by the seam 950. As another example, the second signal conducting portion 912 and the ground conducting portion 913 may be seamlessly and integrally manufactured. As another example, the first signal conducting portion 911 and the ground conducting portion 913 may be seamlessly and integrally manufactured. As another example, the first signal conducting portion 911 and the conductor 942 may be seamlessly manufactured. As another example, the conductor 942 and the ground conducting portion 913 may be seamlessly manufactured.

Accordingly, as described with reference to FIG. 9, any of the components of the resonator may be seamlessly manufactured with adjacent components of the resonator.

Referring to FIG. 9, a type of a seamless connection connecting at least two partitions into an integrated form is referred to as a bulky type.

Figure 10:
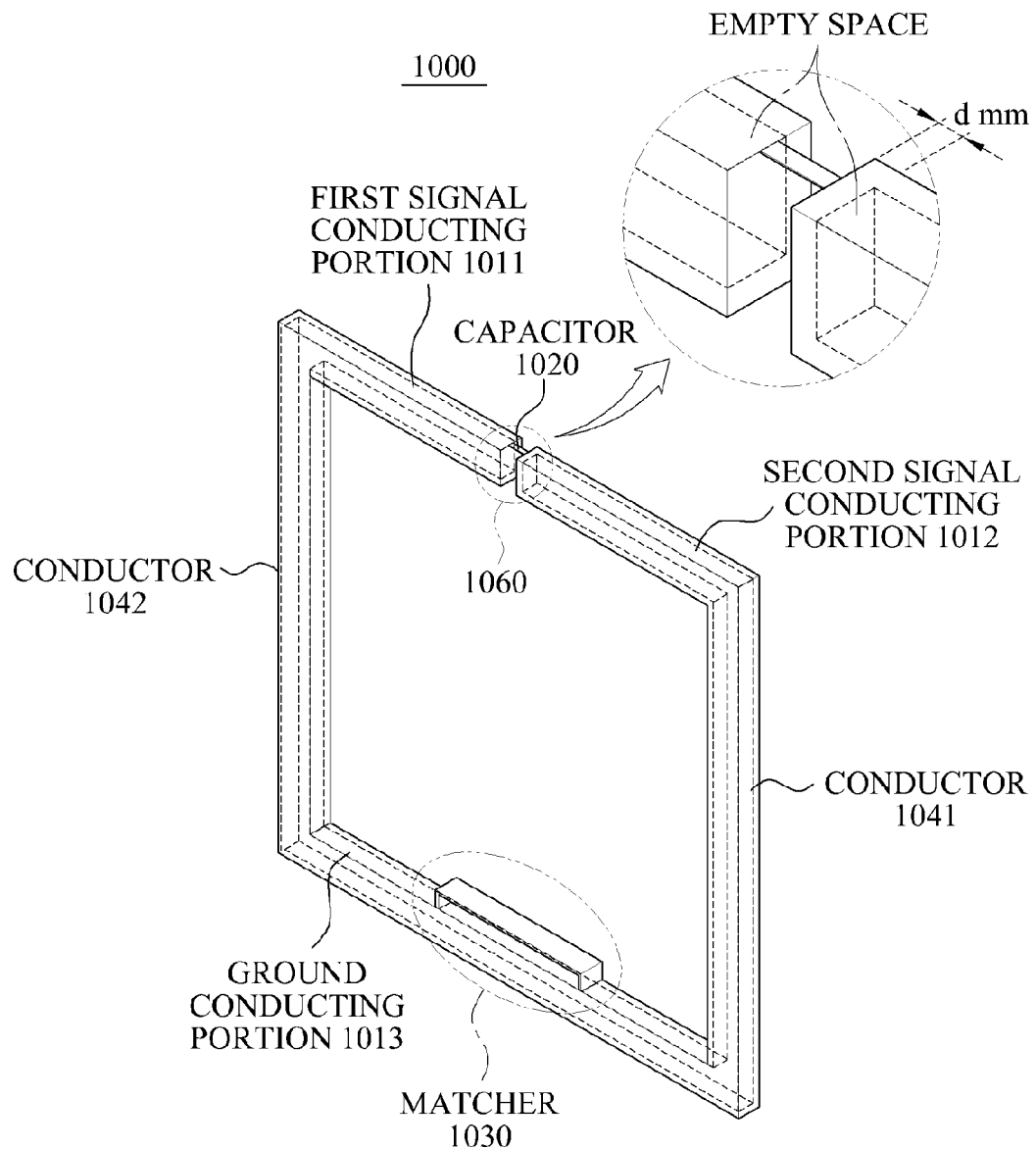

FIG. 10 illustrates an example of a hollow-type resonator for wireless power transmission.

Referring to FIG. 10, each of a first signal conducting portion 1011, a second signal conducting portion 1012, a ground conducting portion 1013, and conductors 1041 and 1042 of the resonator 1000 configured as the hollow type include an empty or hollow space inside.

In a given resonance frequency, an active current may be modeled to flow in only a portion of the first signal conducting portion 1011 instead of the entire first signal conducting portion 1011, may be modeled to flow in only a portion of the second signal conducting portion 1012 instead of the entire second signal conducting portion 1012, may be modeled to flow in only a portion of the ground conducting portion 1013 instead of the entire ground conducting portion 1013, and/or may be modeled to flow in only a portion of the conductors 1041 and 1042 instead of the entire conductors 1041 and 1042. For example, when a depth of each of the first signal conducting portion 1011, the second signal conducting portion 1012, the ground conducting portion 1013, and the conductors 1041 and 1042 is significantly deeper than a corresponding skin depth in the given resonance frequency, it may be ineffective. As a result, the significantly deeper depth may increase a weight or manufacturing costs of the resonator 1000.

Accordingly, in the given resonance frequency, the depth of each of the first signal conducting portion 1011, the second signal conducting portion 1012, the ground conducting portion 1013, and the conductors 1041 and 1042 may be determined based on the corresponding skin depth of each of the first signal conducting portion 1011, the second signal conducting portion 1012, the ground conducting portion 1013, and the conductors 1041 and 1042. When each of the first signal conducting portion 1011, the second signal conducting portion 1012, the ground conducting portion 1013, and the conductors 1041 and 1042 have a depth deeper than a corresponding skin depth, the resonator 1000 may become light in weight, and manufacturing costs of the resonator 1000 may also decrease.

For example, as shown in FIG. 10, the depth of the second signal conducting portion 1012 may be determined as "d" mm and d may be determined according to $$d = \frac{1}{\sqrt{\pi f \mu \sigma}}.$$

In this example, f denotes a frequency, μ denotes a magnetic permeability, and σ denotes a conductor constant. For example, when the first signal conducting portion 1011, the second signal conducting portion 1012, the ground conducting portion 1013, and the conductors 1041 and 1042 are made of a copper and have a conductivity of $5.8 \times 10^7$ siemens per meter (S·m$^{-1}$), the skin depth may be about 0.6 mm with respect to 10 kHz of the resonance frequency and the skin depth may be about 0.006 mm with respect to 100 MHz of the resonance frequency.

Figure 11:
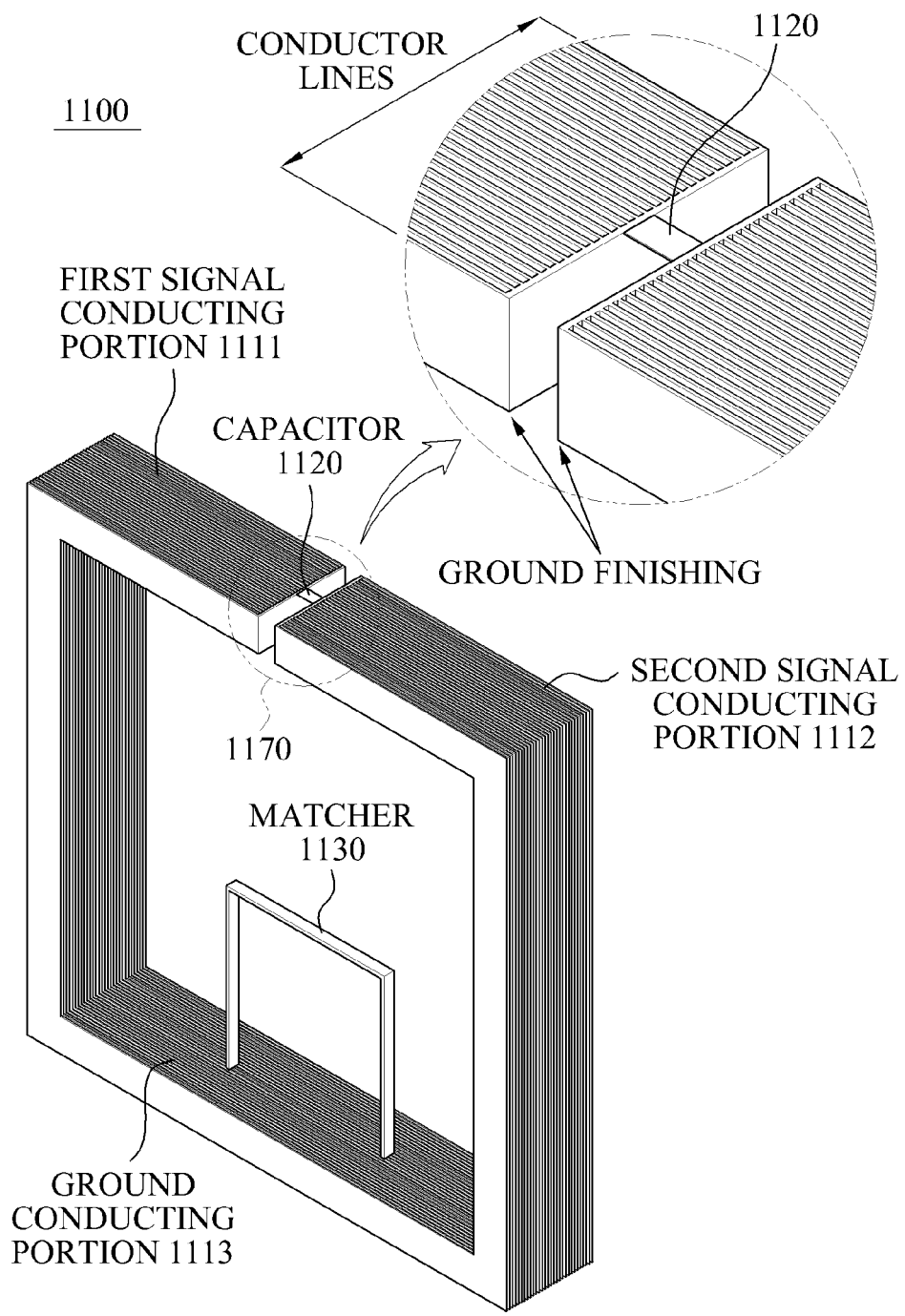

FIG. 11 illustrates an example of a resonator for wireless power transmission using a parallel-sheet.

Referring to FIG. 11, the parallel-sheet may be applicable to each of a first signal conducting portion 1111 and a second signal conducting portion 1112 included in the resonator 1100.

Each of the first signal conducting portion 1111 and the second signal conducting portion 1112 may not be a perfect conductor, and thus, they may have a resistance. Due to the resistance, an ohmic loss may occur. The ohmic loss may decrease a Q-factor and also decrease a coupling effect.

By applying the parallel-sheet to each of the first signal conducting portion 1111 and the second signal conducting portion 1112, it is possible to decrease the ohmic loss, and to increase the Q-factor and the coupling effect. Referring to a portion 1170 indicated by a circle, when the parallel-sheet is applied, each of the first signal conducting portion 1111 and the second signal conducting portion 1112 may include a plurality of conductor lines. For example, the plurality of conductor lines may be disposed in parallel, and may be shorted at an end portion of each of the first signal conducting portion 1111 and the second signal conducting portion 1112.

As described above, when the parallel-sheet is applied to each of the first signal conducting portion 1111 and the second signal conducting portion 1112, the plurality of conductor lines may be disposed in parallel. Accordingly, a sum of resistances having the conductor lines may decrease. Consequently, the resistance loss may decrease, and the Q-factor and the coupling effect may increase.

Figure 12:
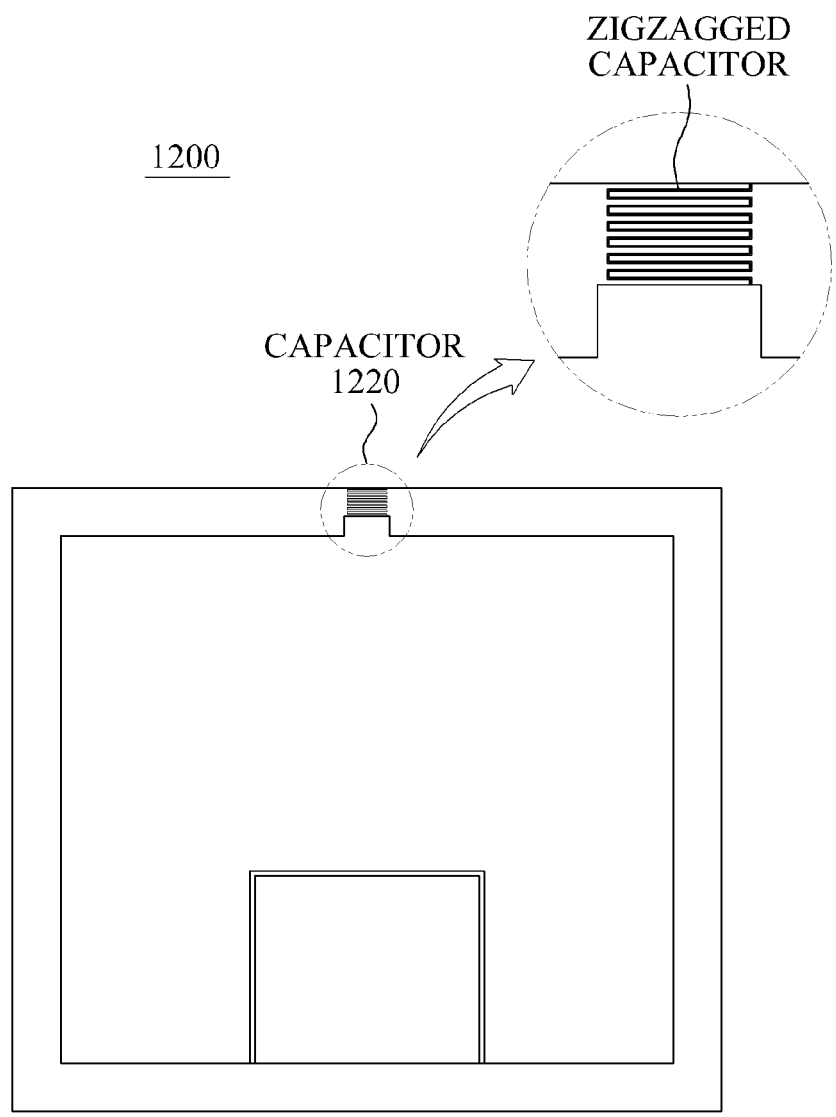

FIG. 12 illustrates an example of a resonator for wireless power transmission that includes a distributed capacitor.

Referring to FIG. 12, a capacitor 1220 included in the resonator 1200 for the wireless power transmission may be a distributed capacitor. A capacitor as a lumped element may have a relatively high equivalent series resistance (ESR). For example, using the capacitor 1220 as a distributed element, it is possible to decrease the ESR. A loss caused by the ESR may decrease a Q-factor and a coupling effect.

As shown in FIG. 12, the capacitor 1220 as the distributed element may have a zigzagged structure. For example, the capacitor 1220 as the distributed element may be configured as a conductive line and a conductor having the zigzagged structure.

As shown in FIG. 12, by employing the capacitor 1220 as the distributed element, it is possible to decrease the loss occurring due to the ESR. In addition, by disposing a plurality of capacitors as lumped elements, it is possible to decrease the loss occurring due to the ESR. Because a resistance of each of the capacitors as the lumped elements decreases through a parallel connection, active resistances of parallel-connected capacitors as the lumped elements may also decrease and the loss occurring due to the ESR may decrease. For example, by employing ten capacitors of 1 pF instead of using a single capacitor of 10 pF, it is possible to decrease the loss occurring due to the ESR.

Figure 13A:
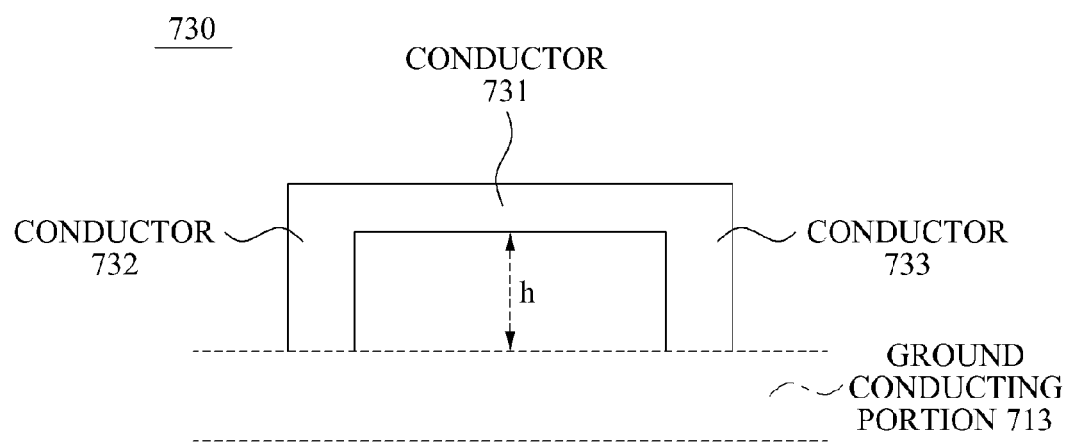

FIG. 13A illustrates an example of a matcher that may be included in the resonator provided in the 2D structure of FIG.

Figure 13B:
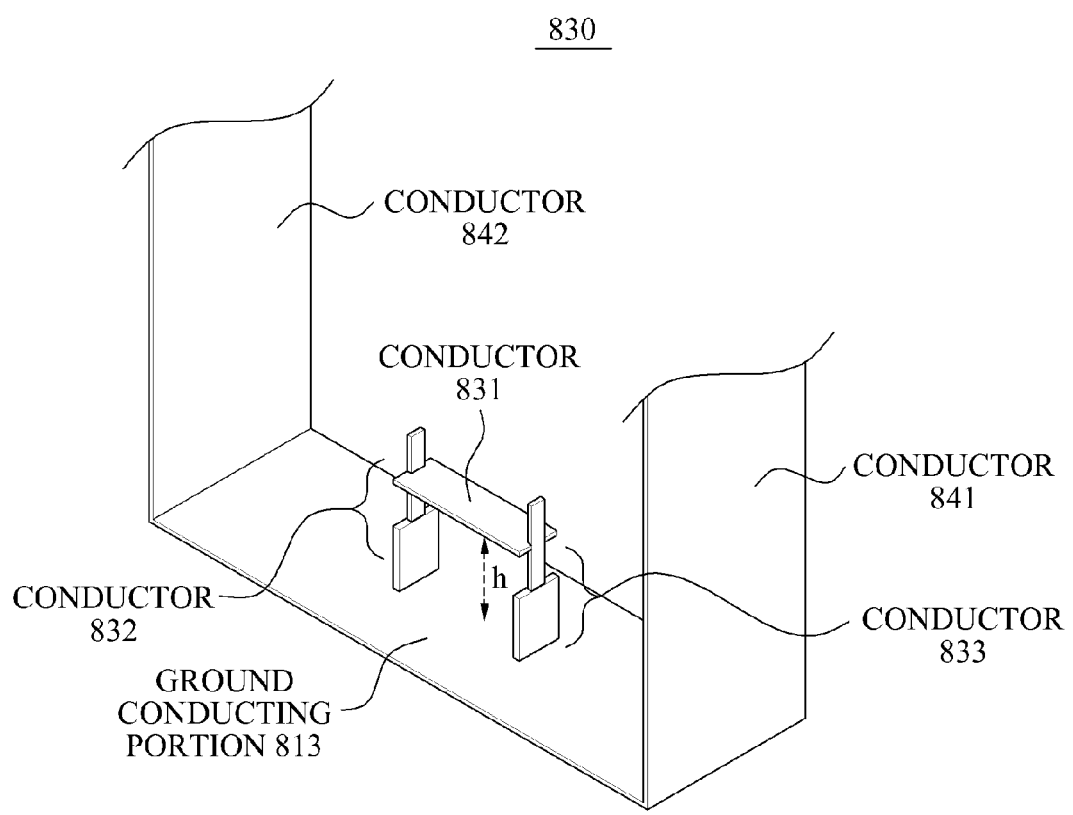

7, and FIG. 13B illustrates an example of a matcher that may be included in the resonator provided in the 3D structure of FIG. 8.

FIG. 13A illustrates a portion of the 2D resonator including the matcher 730, and FIG. 13B illustrates a portion of the 3D resonator of FIG. 8 including the matcher 830.

Referring to FIG. 13A, the matcher 730 includes a conductor 731, a conductor 732, and a conductor 733. The conductors 732 and 733 may be connected to a ground conducting portion 713 and the conductor 731. The impedance of the 2D resonator may be determined based on a distance h between the conductor 731 and the ground conducting portion 713. For example, the distance h between the conductor 731 and the ground conducting portion 713 may be controlled by the controller. The distance h between the conductor 731 and the ground conducting portion 713 may be adjusted using a variety of schemes. For example, the variety of schemes may include a scheme of adjusting the distance h by adaptively activating one of the conductors 731, 732, and 733, a scheme of adjusting the physical location of the conductor 731 up and down, and the like.

Referring to FIG. 13B, the matcher 830 includes a conductor 831, a conductor 832, and a conductor 833. The conductors 832 and 833 may be connected to a ground conducting portion 813 and the conductor 831. The conductors 832 and 833 may be connected to the ground conducting portion 813 and the conductor 831. The impedance of the 3D resonator may be determined based on a distance h between the conductor 831 and the ground conducting portion 813. For example, the distance h between the conductor 831 and the ground conducting portion 813 may be controlled by the controller. Similar to the matcher 730 included in the 2D structured resonator, in the matcher 830 included in the 3D structured resonator, the distance h between the conductor 831 and the ground conducting portion 813 may be adjusted using a variety of schemes. For example, the variety of schemes may include a scheme of adjusting the distance h by adaptively activating one of the conductors 831, 832, and 833, a scheme of adjusting the physical location of the conductor 831 up and down, and the like.

Although not illustrated in FIGS. 13A and 13B, the matcher may include an active element. A scheme of adjusting an impedance of a resonator using the active element may be similar as described above. For example, the impedance of the resonator may be adjusted by changing a path of a current flowing through the matcher using the active element.

Figure 14:
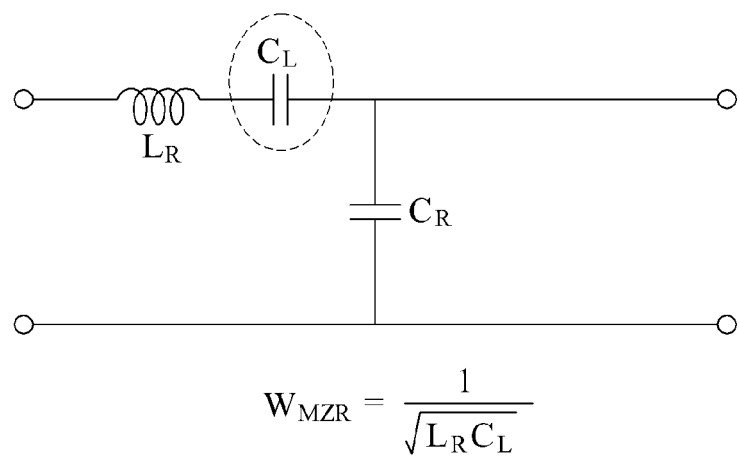
FIG. 14 is a diagram illustrating an example of an equivalent circuit of the resonator for wireless power transmission of FIG. 7.

FIG. 14 illustrates an example of an equivalent circuit of the resonator for wireless power transmission of FIG. 7.

The resonator 700 for the wireless power transmission may be modeled to the equivalent circuit of FIG. 14. In the equivalent circuit of FIG. 14, $C_L$ denotes a capacitor that is inserted in the form of a lumped element at approximately the middle of the transmission line of FIG. 7.

In this example, the resonator 700 may have a zeroth resonance characteristic. For example, when a propagation constant is "0", the resonator 700 may be assumed to have $\omega_{MZR}$ as a resonance frequency. The resonance frequency $\omega_{MZR}$ may be expressed by Equation 2.

$$\omega_{MZR} = \frac{1}{\sqrt{L_R C_L}} \quad \text{[Equation 2]}$$

In Equation 2, MZR denotes a Mµ zero resonator.

Referring to Equation 2, the resonance frequency $\omega_{MZR}$ of the resonator 700 may be determined by $L_R/C_L$. A physical size of the resonator 700 and the resonance frequency $\omega_{MZR}$ may be independent with respect to each other. Because the physical sizes are independent with respect to each other, the physical size of the resonator 700 may be sufficiently reduced.

The methods, processes, functions, and software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable laptop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A resonance power receiver, comprising:
a first resonator and a second resonator configured to receive a resonance power;
a phase detector configured to detect a phase of a signal received via the first resonator, and detect a phase of a signal received via the second resonator;
a phase shifter configured to shift the phase of the signal received via the second resonator so that the phase of the signal received via the first resonator and the phase of the signal received via the second resonator are in phase;
a combiner configured to combine the signal received via the first resonator with the signal of which the phase is shifted by the phase shifter; and
a switch unit configured to connect an output voltage of a rectifier to a load in response to the signal received via the first resonator being in-phase combined with the signal of which the phase is shifted by the phase shifter.

2. The resonance power receiver of claim 1, further comprising:
the rectifier configured to generate a direct current (DC) voltage by rectifying an output signal of the combiner.

3. The resonance power receiver of claim 2, further comprising:
a DC-to-DC (DC/DC) converter configured to provide an output voltage of the rectifier to a load.

4. A resonance power receiver, comprising:
a reception resonance unit comprising resonators configured to receive a resonance power;
a rectification unit comprising rectifiers configured to rectify respective output signals of the resonators;
a charging unit configured to store an output voltage of each of the rectifiers; and
a switch unit configured to selectively connect a voltage stored in the charging unit to a load based on a power consumption mode,
wherein, in response to the power consumption mode corresponding to an operating mode, the switch unit is configured to connect the voltage stored in the charging unit to all loads desiring power.

5. A resonance power receiver, comprising:
a reception resonance unit comprising resonators configured to receive a resonance power;
a rectification unit comprising rectifiers configured to rectify respective output signals of the resonators;
a charging unit configured to store an output voltage of each of the rectifiers; and
a switch unit configured to selectively switch a voltage stored in the charging unit based on a power consumption mode,
wherein the charging unit is configured to receive the output voltage of each of the rectifiers via input terminals connected to the rectifiers, respectively, and is connected to the switch unit via a single output terminal.

6. A resonance power receiver, comprising:
a reception resonance unit comprising resonators configured to receive a resonance power;
a rectification unit comprising rectifiers configured to rectify respective output signals of the resonators;
a charging unit configured to store an output voltage of each of the rectifiers; and
a switch unit configured to selectively switch a voltage stored in the charging unit based on a power consumption mode,
wherein the charging unit comprises chargers that are connected to the rectifiers, respectively, and
wherein the switch unit is configured to selectively switch each of the chargers based on the power consumption mode.

7. The resonance power receiver of claim 4, wherein, in response to the power consumption mode corresponding to a sleep mode or a power save mode, the switch unit is configured to connect the voltage stored in the charging unit to a particular load that performs an idle operation of the resonance power receiver.

8. A resonance power receiver, comprising:
a reception resonance unit comprising resonators configured to receive a resonance power;
a rectification unit comprising rectifiers configured to rectify respective output signals of the resonators;
a charging unit configured to store an output voltage of each of the rectifiers;
a switch unit configured to selectively switch a voltage stored in the charging unit based on a power consumption mode;
a first phase detector configured to detect a phase of a signal received via a first resonator among the resonators, and detect a phase of a signal received via a second resonator among the resonators;
a first phase shifter configured to shift the phase of the signal received via the second resonator so that the phase of the signal received via the first resonator and the phase of the signal received via the second resonator are in phase;
a first combiner configured to combine the signal of the received via the first resonator with the signal of which the phase is shifted by the first phase shifter;
a second phase detector configured to detect a phase of a signal received via a third resonator among the resonators, and detect a phase of a signal received via a fourth resonator among the resonators;
a second phase shifter configured to shift the phase of the signal received via the fourth resonator so that the phase of the signal received via the third resonator and the phase of the signal received via the fourth resonator are in phase; and
a second combiner configured to combine the signal received via the third resonator with the signal of which the phase is shifted by the second phase shifter.

* * * * *